(12) United States Patent
Tatsuda

(10) Patent No.: US 6,698,306 B2
(45) Date of Patent: Mar. 2, 2004

(54) MULTISHAFT INDEX TABLE

(75) Inventor: Yoshinori Tatsuda, Ishikawa-ken (JP)

(73) Assignee: Tsudakoma Kogyo Kabushiki Kaisha (JP)

( * ) Notice: Subject to any disclaimer, the term of this patent is extended or adjusted under 35 U.S.C. 154(b) by 13 days.

(21) Appl. No.: 10/044,156

(22) Filed: Jan. 10, 2002

(65) Prior Publication Data
US 2002/0094900 A1 Jul. 18, 2002

(30) Foreign Application Priority Data
Jan. 18, 2001 (JP) ........................................ 2001-009902

(51) Int. Cl.⁷ ................................................ F16H 1/16
(52) U.S. Cl. .......................................... 74/427; 74/724
(58) Field of Search ....................... 74/427, 724, 813 R

(56) References Cited

U.S. PATENT DOCUMENTS

| | | | | |
|---|---|---|---|---|
| 2,610,527 A | * | 9/1952 | Papay .......................... | 74/724 |
| 2,931,241 A | * | 4/1960 | Scott ........................... | 74/427 |
| 3,252,349 A | * | 5/1966 | Widdrington ................. | 74/427 |
| 5,188,004 A | * | 2/1993 | Kitagawa ..................... | 74/724 |
| 5,598,749 A | * | 2/1997 | Goto ........................... | 74/724 |

* cited by examiner

Primary Examiner—Dirk Wright
(74) Attorney, Agent, or Firm—The Webb Law Firm

(57) ABSTRACT

This multishaft index table comprises: a drive shaft having a plurality of worms arranged in series in its axial direction; a plurality of worm wheels respectively meshed with the worms; at least one motor; and at least one rotation transmitting member for transmitting to the drive shaft the rotation of a motor upon receipt thereof. The rotation transmitting members are disposed in at least one portion selected from a group including at least one of the drive shaft portions between adjoining worms, at least one end of the drive shaft and at least one of drive shaft portions between adjoining worms, and both end portions of the drive shaft.

5 Claims, 6 Drawing Sheets

MULTISHAFT INDEX TABLE

BACKGROUND OF THE INVENTION

1. Field of the Invention

The present invention relates to a multishaft index table using a plurality of worms.

2. Description of Prior Art

A multishaft index table generally has a plurality of worms arranged in series in a drive shaft in its axial direction, a gear-shaped rotation transmitting member for receiving the rotation of at least one motor disposed in the drive shaft, and a worm wheel meshed with each worm.

Such a multishaft index table rotates the drive shaft when the rotation transmitting member receives the rotation of the motors to synchronously rotate the worms by the drive shaft, thereby synchronously rotating the worm wheels and synchronously rotating the table coupled with the worm wheels.

In some of such index tables, each worm and a drive shaft portion are integrally produced and each drive shaft portion is connected with an adjacent drive shaft portion by a coupler to form a drive shaft, and in others of such index tables, worms and drive shafts are separately produced and the worms are coupled with the drive shafts by couplers such as keys or combining members.

In either of the above-mentioned multishaft index tables, the rotation transmitting member is disposed at one end portion of the drive shaft and transmits the rotation of the motor to the one end portion of the drive shaft. Consequently, the drive shaft, rotated upon receipt of the rotation force of the rotation transmitting member at its one end portion, rotates a plurality of worms.

SUMMARY OF THE INVENTION

In the conventional multishaft index table mentioned above, however, the rotation of the motor is only transmitted to the one end portion of the drive shaft, so that, when the rotation starts, a load passing from a corresponding table through a worm wheel and a load such as machining thrust act on worms such that, the nearer the worms are to the placement of the rotation transmitting member, the earlier they are subjected to the loads.

For instance, the load from the worm wheel in the first shaft meshed with the first worm which is the nearest to the placement of the rotation transmitting member firstly acts on the first worm, and then the load from the worm wheel in the second shaft meshed with the second worm which is in the second nearest position to the placement of the rotation transmitting member acts on the second worm.

As a result, the first worm is distorted relative to the second worm, causing displacement in positioning of the first shaft and the second shaft, and causing distortion between adjoining worms to displace the rotational angle positions of adjoining worm wheels and to displace the tables connected therewith. The farther from the placement of the rotation transmitting member, the greater the displacement of the rotational angle position is.

An object of the present invention lies in enabling accurate positioning of a table of each shaft by controlling the influence of loads from other tables to the minimum.

The multishaft index table according to the present invention comprises: a drive shaft having a plurality of worms arranged in series in the axial direction; a plurality of worm wheels respectively meshed with the worms; at least one motor; and at least one rotation transmitting member which transmits the rotation of the motor, upon receipt thereof, to the drive shaft. The rotation transmitting member is disposed in at least one portion selected from a group including at least one of the drive shaft portions between adjoining worms, at least one end of the drive shaft portion and at least one of drive shaft portions between adjoining worms, and both end portions of the drive shaft.

The rotation of the motor is transmitted to the drive shaft through the rotation transmitting member disposed at positions close to the worms, and the rotation of the drive shaft is transmitted to the worm wheel through the worms. Consequently, when the motor rotates, the table connected with the worm wheel is rotated.

In the present invention, since at least one rotation transmitting member is disposed in a position close to each worm of the drive shaft, the rotation of the motor is transmitted to the position close to each worm, irrespectively of the placement of the worms in the axial direction of the drive shaft. Consequently, influence of a load due to jigs and machining thrust from other tables on each worm is controlled to the minimum, thereby enabling accurate positioning of each table.

The multishaft index table can further comprise an intermediate drive shaft where a first transmitting member for receiving the rotation of the motor and a second transmitting member for transmitting the rotation of the first transmitting member, upon receipt thereof, to the rotation transmitting member. With this, by using the intermediate drive shaft, a plurality of the second transmitting members can be used, so that the range where the rotation of the motor can be transmitted is widened, thereby enabling accurate positioning of more tables.

The above-mentioned rotation transmitting member, the first transmitting member and the second transmitting member can use either a gear or a belt pulley. Using a gear or a belt pulley simplifies the structure of a rotation transmitting route from the motor to the worm wheel and enables to produce the multishaft index table at a low cost. Using a belt is also effective to lower noise.

PREFERRED EMBODIMENT OF THE INVENTION

Figure 1:
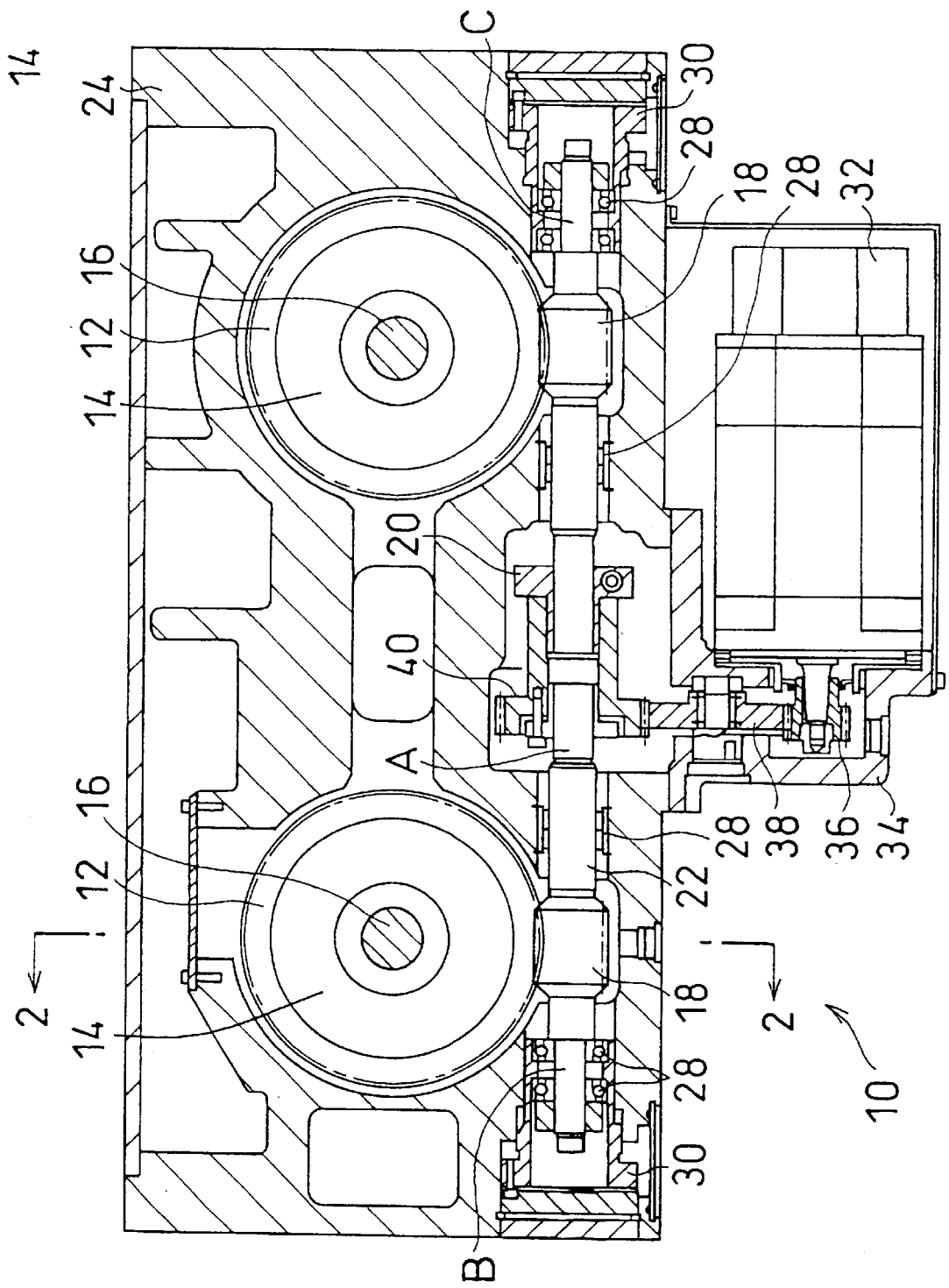
FIG. 1 is a vertical sectional view showing an embodiment of the multishaft index table according to the present invention.
Figure 2:
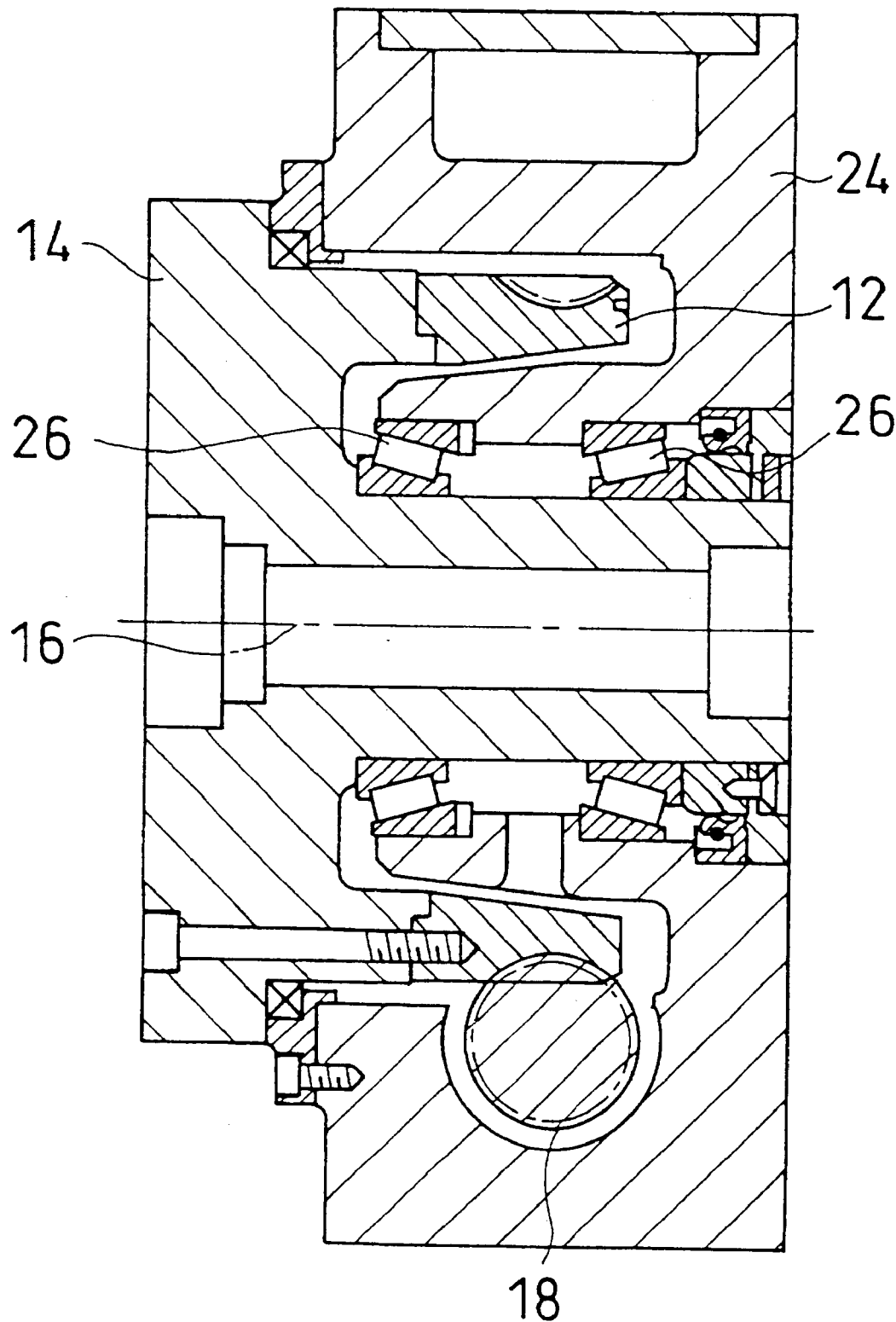
FIG. 2 is a sectional view obtained along the line 2—2 in FIG. 1.

Referring to FIGS. 1 and 2, the index table 10 is a double-shaft index table having two table shafts 16 each having a worm wheel 12 and a table 14 assembled.

This index table 10 also comprises two sets of worms 18 each meshed with the worm wheel 12 and a drive shaft 22 which connects drive shaft portions integrally formed at both worms 18 by a suitable coupler 20 such as a shaft coupling at their end portions.

In the illustrated example, each table 14 is rotatably received on a body 24 by a plurality of bearings 26, and each worm wheel 12 is assembled into the corresponding table 14 by a plurality of screw members so as not to rotate relatively. Each table shaft 16 extends through the corresponding table 14.

However, it is possible to have the body 24 rotatably support the worm wheel 12 or the table shaft 16 and to assemble each table 14 and table shaft 16 or each worm wheel 12 into the worm wheel 12 or the table shaft 16.

The drive shaft 22 is disposed within the body 24 such that the worms 18 are arranged at intervals in the direction of their rotation axes and such that the rotation axes of the worms 18 are coaxial, and is also rotatably assembled into the body 24 by a bearing 28 and a bearing presser 30 or the like at plural positions at intervals in the axial direction. In the illustrated example, the drive shaft 22 is rotatably received at the shaft portions at its both ends as well as at the shaft portion between the adjoining worms 18.

A motor 32 as a rotary source is assembled into a bracket 34 which is assembled into the body 24. The motor 32 is a motor whose rotational angle position is controlled like a servo motor. A driving gear 36 is assembled into the rotation shaft of the motor 32 so as not to rotate relatively. The driving gear 36 is meshed with an intermediate gear 38 rotatably borne at the bracket 34.

A driven gear 40 as a rotation transmitting member for receiving the rotation of the motor 32 is assembled into a corresponding position A (shaft portion) of the drive shaft 22 between adjoining worms 18 so as not to rotate relatively and is also meshed with the intermediate gear 38. Consequently, the rotation of the motor 32 is transmitted from the driving gear 36 to the driven gear 40 through the intermediate gear 38, and further transmitted from the driven gear 40 to the shaft portion between both worms 18 in the axial direction of the drive shaft 22.

The body 24 is provided with a lid, a cover, an end plate, a sealing member and the like, but explanation on them is omitted, not to prevent understanding of the present invention and the embodiments.

In the index table 10, the rotation of the motor 32 is transmitted by the gears 36, 38, 40 to the shaft portion between both worms 18 in the axial direction of the drive shaft 22, as described above. Consequently, irrespectively of the placement of the worms 18 in the axial direction of the drive shaft 22, the rotation of the motor 32 is transmitted to a position close to each worm 18, so that the influence of loads from other tables on each worm 18 is controlled to the minimum, and each table 14 can be accurately positioned.

Figure 5:
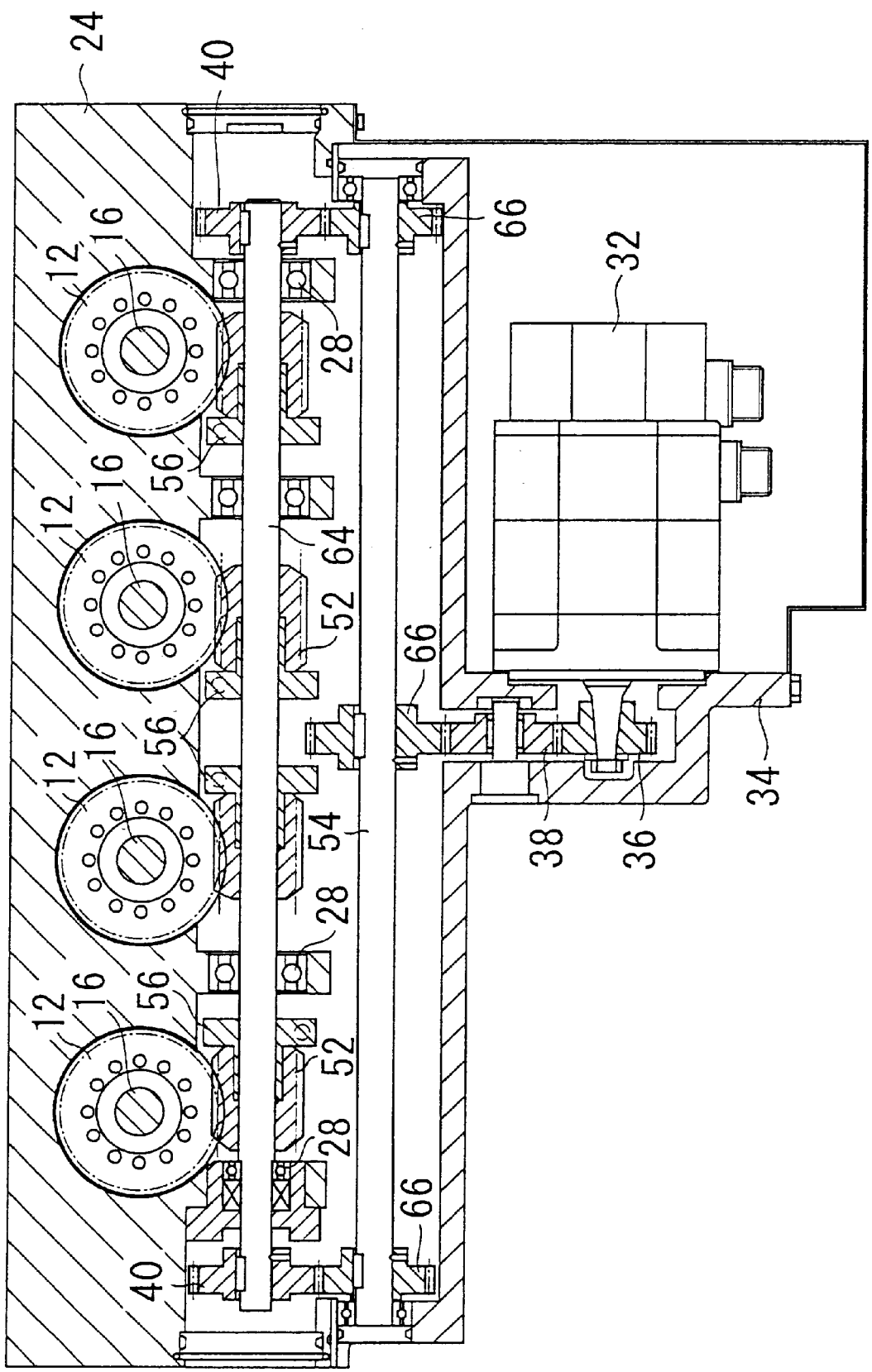
FIG. 5 is a vertical view showing still another embodiment of the multishaft index table according to the present invention.
Figure 6:
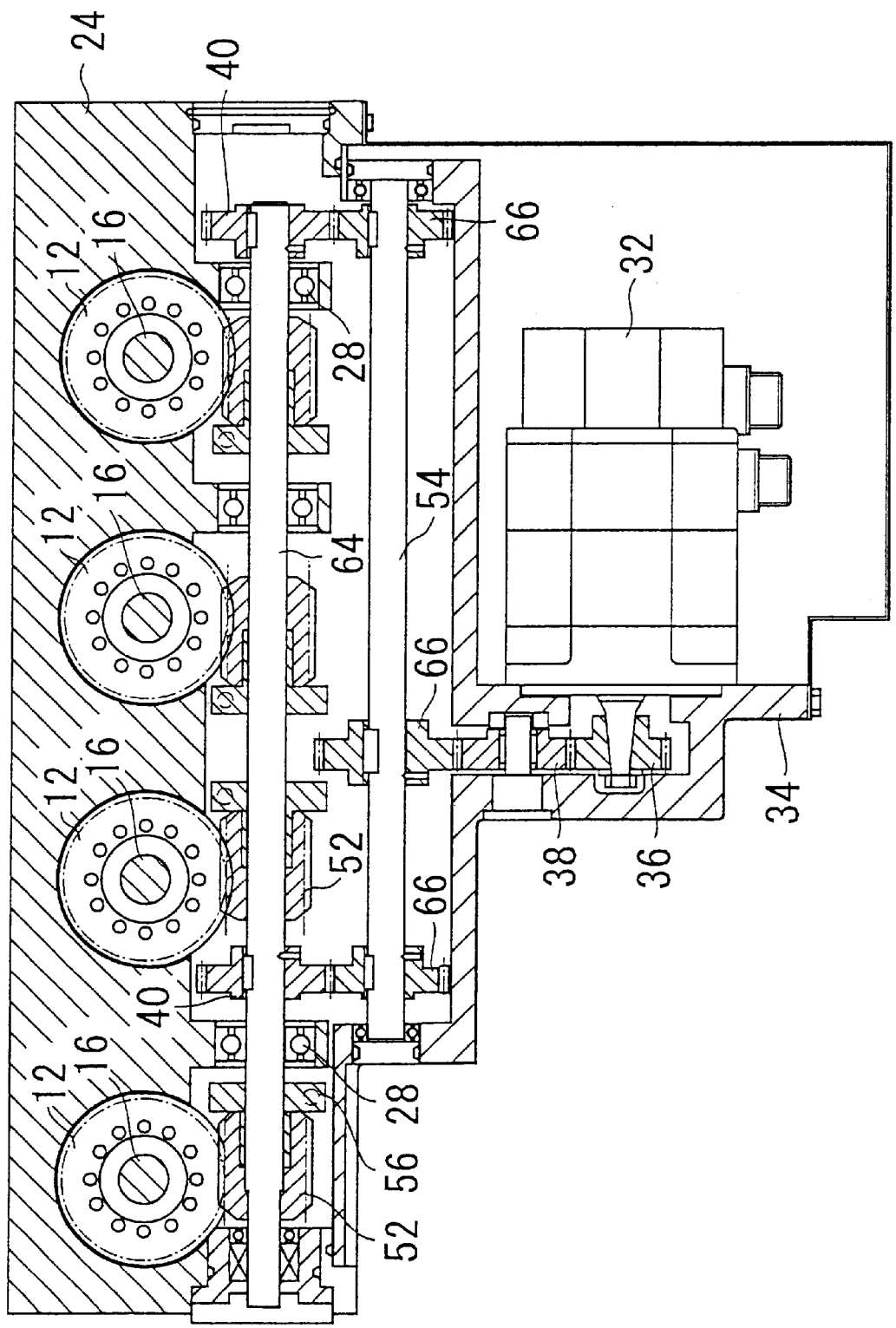
FIG. 6 is a vertical section showing still another embodiment of the multishaft index table according to the present invention.

While the foregoing embodiment is of a doubt-shaft index table,the present invention can be applied to other multishaft index tables comprising three or more worms. In any of the above-mentioned index tables, the driven gear 40 is disposed at at least one shaft portion selected from a group including at least one of the shaft portions between adjoining worms at least one end of the drive shaft portion and at least one of drive shaft portions between adjoining worms (FIG. 6) and both end portions of the drive shaft (FIG. 5).

In any case of multishaft index tables, a plurality of driven gears may be used. For example, in case of a double-shaft index table, driven gears may be disposed in shaft portions B and C respectively of both end portions of drive shafts, and in case of an index table with three or more shafts, a driven gear may be disposed in each shaft portion between adjoining worms, or in each shaft portion between adjoining worms as well as at each end portion of the drive shafts. When using a plurality of driven gears, a plurality of transmitting gears as a first and a second transmitting members as well as an intermediate drive shaft supporting them can be used.

Figure 3:
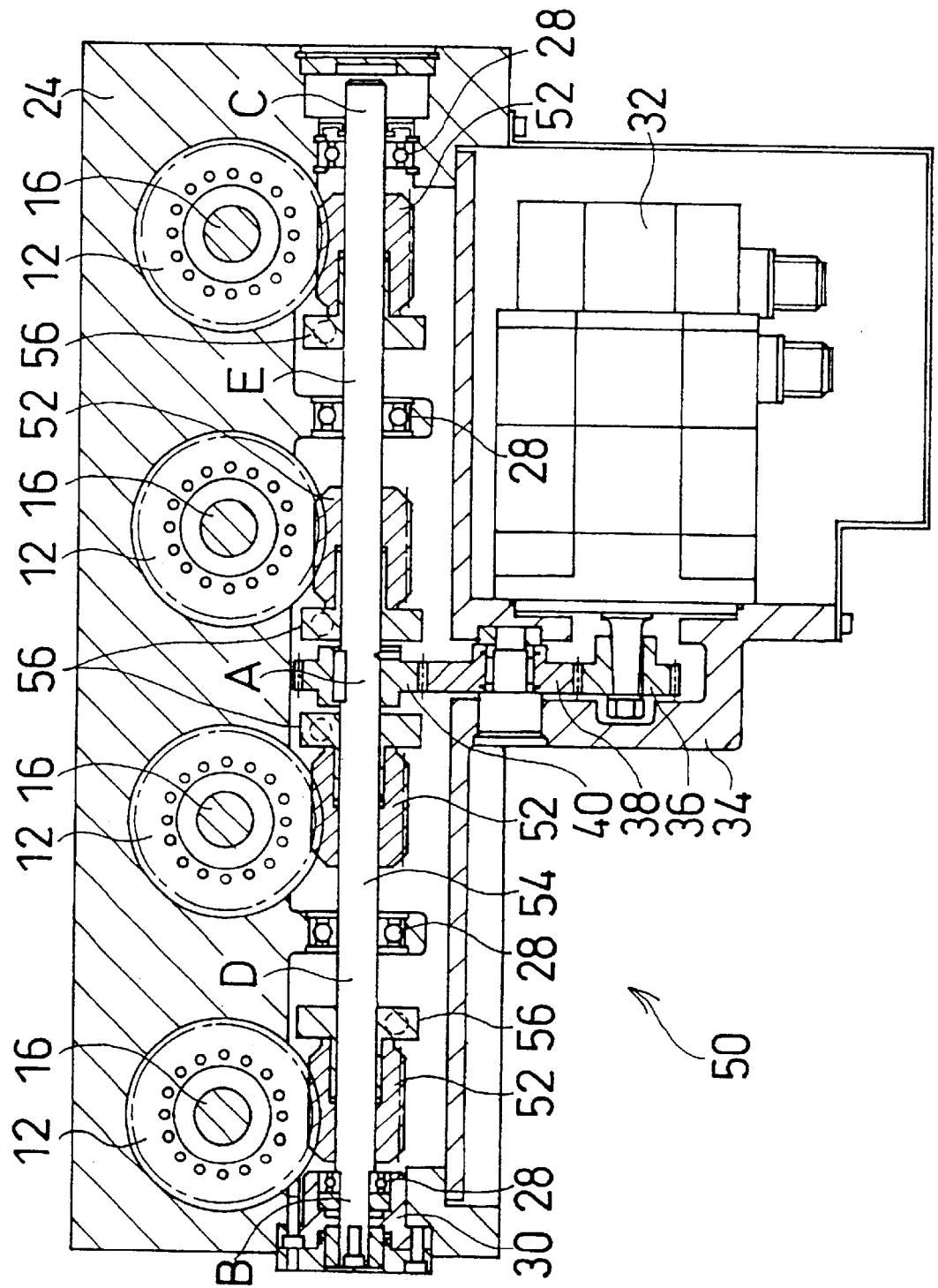
FIG. 3 is a vertical sectional view showing another embodiment of the multishaft index table relative to the present invention.

Referring to FIG. 3, an index table 50 is a four-shaft index table in which four hollow worms 52 are releasable coupled with a common drive shaft 54 by a coupler 56.

The worms 52 are spaced apart in the axial direction of the drive shaft 54. The drive shaft 54 extends through the hollow portions of worms 52 and is roatably received of the body 24 by a bearing 28 of the like between both ends of worms 52 adjacent thereto.

In the illustrated example, in the index table 50, the driven gear 40 is assembled into the shaft portion A between adjoining two worms 52 which are positioned on the central side in the axial direction of the drive shaft 54.

However, the driven gear 40 may be assembled into the shaft portion D between the adjoining two worms 52 located on the left side of the drive shaft 54 in FIG. 3, or into the shaft portion E between the adjoining two worms 52 located on the right side. Also, the driven gears 40 may be assembled into two positions of shaft portions D, E at both ends of the drive shaft 54, or into three or more positions, that is, into at least one position of each shaft portion A, D, E between the adjoining worms 52 as well as into two positions of the shaft portions B, C at both ends of the drive shaft 54.

In any case, the rotation of the motor 32 is transmitted to each shaft portion between adjoining worms 52 through the driven gear 40. Consequently, irrespectively of the placement of the worms 52 in the axial direction of the drive shaft 54, the rotation of the motor 32 is transmitted to the shaft portion close to adjoining worms 52 through the driven gear 40, whereby the influence of a load from other tables upon the adjoining worms 52 at least through the driven gear 40 can be controlled to the minimum, and the tables corresponding thereto are accurately positioned.

Further, since the worms away from the driven gear are close to the driven gear in comparison with the conventional art which disposes the driven gear at one end portion of the drive shaft, the worms 52 are influenced the less by a load from other tables; therefore, the tables corresponding thereto are accurately positioned.

When a plurality of driven gears are disposed in the drive shaft, it is possible to have the rotating motion of each motor transmitted to at least one driven gear by using a plurality of motors. For example, when the driven gears 40 are assembled into five positions, that is, respective shaft portions A, D, E of the drive shaft 54 between adjoining worms 52 and the shaft portions B, C at both ends, it is possible to use a plurality of motors to transmit the rotating motion of each motor to at least one driven gear.

Figure 4:
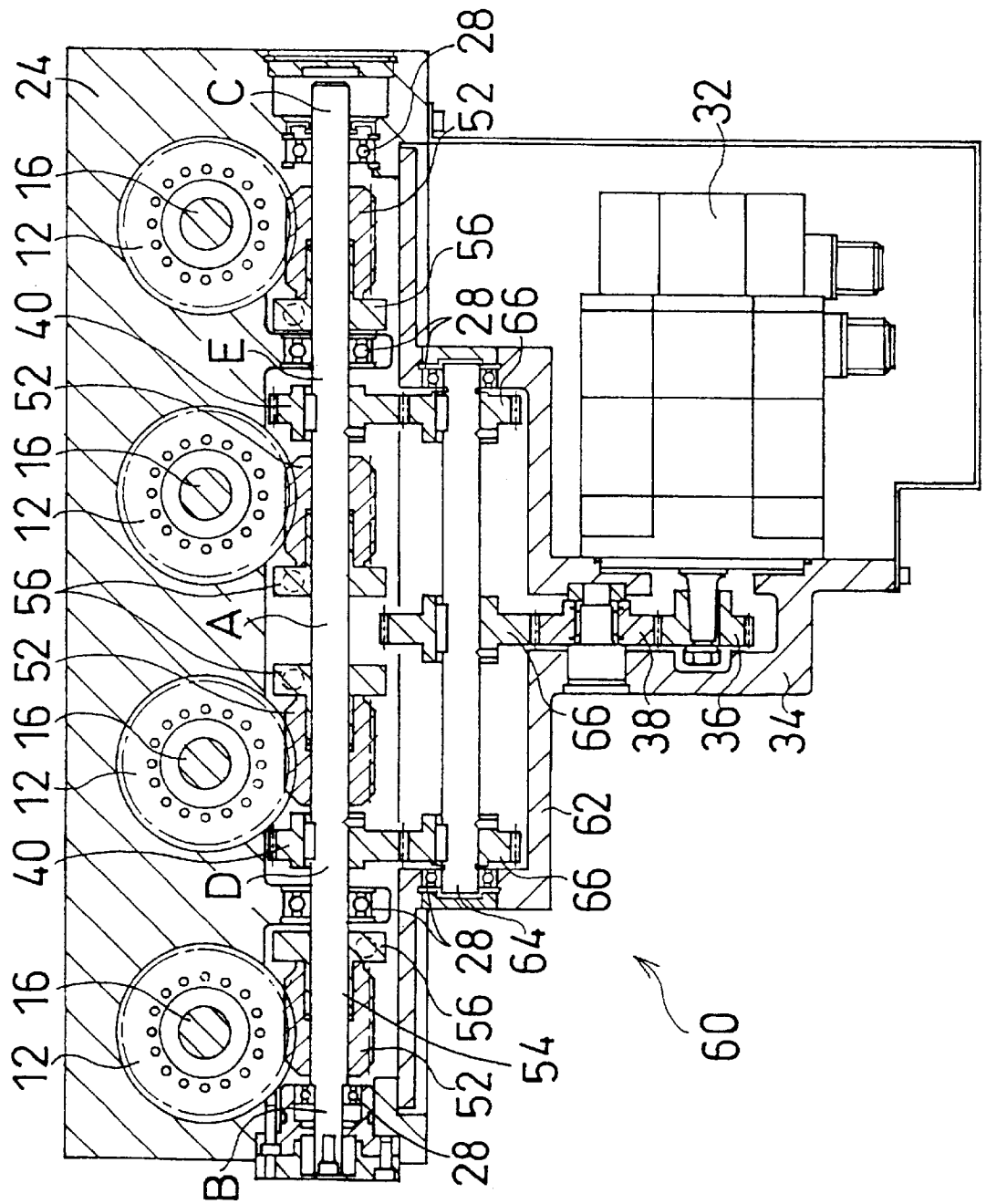
FIG. 4 is a vertical section showing still another embodiment of the multishaft index table according to the present invention.

Referring to FIG. 4, the index table 60 is a four-shaft index table with four hollow worms 52 release ably combined with a common drive shaft 54 by couplers 56.

In the index table 60, however, the driven gears 40 are assembled into two positions, that is, in the shaft portion D between adjoining two worms 52 located on the left side of the drive shaft 54 and the shaft portion E between adjoining two worms 52 located on the right side.

Consequently, the index table 60 further has: a bracket 34 assembled into the body 24 by a second bracket 62; an intermediate drive shaft 64 rotatably supported on the body 24 by the second bracket 62; and three transmission gears 66 as transmitting members assembled into the intermediate drive shaft 64 at intervals in its axial direction. The intermediate gear 38 is meshed with the transmission gear 66 located in the middle in the axial direction; and the two transmission gears 66 respectively positioned at both ends in the axial direction are meshed with the driven gears 40.

In the index table 60, the rotation of the motor 32 is transmitted to the shaft portions D, E of the drive shaft 54 between the adjoining worms 52 by the gears 36, 38, 66, 40. As a result, irrespectively of the placement of the worms 18 in the axial direction of the drive shaft 54, the rotation of the motor 32 is transmitted to the positions close to respective worms 52, so that the influence of loads from other tables upon respective worms 52 can be controlled to the minimum, and the tables corresponding to them are accurately positioned.

In the embodiment shown in FIG. 4, too, the driven gears 40 may be assembled into any at least one positions of the shaft portions A, D, E between the adjoining worms 52, or may be assembled into any at least one positions of the shaft portions A, D, E and the shaft portions B and C. In any case, the transmission gears 66 are disposed at positions corresponding to the placement of the driven gears 40.

While the foregoing embodiments use gears as rotation transmitting means, other rotation transmitting means like a pulley such as a timing pulley, sprocket or the like may be used. When using a pulley, an endless belt such as a timing belt is also used, and when using a sprocket, a chain is also used.

The present invention is not limited to the foregoing embodiments. The present invention can be variously modified without departing from the gist.

What is claimed is:

1. In a multishaft index table having a drive shaft, at least one motor, and at least one rotation transmitting member for transmitting rotation of said motor upon receipt thereof to said drive shaft, the improvement comprising:

a plurality of worms disposed at intervals in an axial direction of said drive shaft;

a plurality of worm wheels respectively meshed with said worms;

a plurality of table shafts respectively corresponding to said worm wheels; and a plurality of tables respectively corresponding to said table shafts, wherein said rotation transmitting member is disposed in at least one portion selected from a group including at least one of said drive shaft portion between adjoining worms, at least one end of said drive shaft portion and at least one of drive shaft portions between adjoining worms, and both end portions of said drive shaft.

2. In the multishaft index table according to claim 1, the improvement further comprising an intermediate drive shaft, a first transmitting member to receive the rotation of said motor and a second transmitting member to transmit to said rotation transmitting member the rotation of said first transmitting member upon receipt thereof.

3. In the multishaft index table according to claim 2, wherein said rotation transmitting member, said first transmitting member and said second transmitting member respectively use either a gear or a belt pulley.

4. In a multishaft index table having a drive shaft, at least one motor, and at least one rotation transmitting member for transmitting rotation of said motor upon receipt thereof to said drive shaft, the improvement comprising:

a plurality of worms disposed in series in an axial direction of said drive shaft;

a plurality of worm wheels respectively meshed with said worms;

an intermediate drive shaft;

a first transmitting member to receive the rotation of said motor; and a second transmitting member to transmit to said rotation transmitting member the rotation of said first transmitting member upon receipt thereof, wherein said rotation transmitting member is disposed in at least one portion selected from a group including at least one of said drive shaft portion between adjoining worms, at least one end of said drive shaft portion and at least one of drive shaft portions between adjoining worms, and both end portions of said drive shaft.

5. In the multishaft index table according to claim 4, wherein said rotation transmitting member, said first transmitting member and said second transmitting member respectively use either a gear or a belt pulley.

* * * * *